US006113725A

United States Patent [19]

Kronzer

[11] Patent Number: 6,113,725

[45] **Date of Patent: *Sep. 5, 2000**

[54] PRINTABLE HEAT TRANSFER MATERIAL HAVING COLD RELEASE PROPERTIES

[75] Inventor: Francis Joseph Kronzer, Marietta, Ga.

[73] Assignee: Kimberly-Clark Worldwide, Inc., Neenah, Wis.

[ * ] Notice: This patent is subject to a terminal disclaimer.

[21] Appl. No.: 09/089,910

[22] Filed: Jun. 3, 1998

Related U.S. Application Data

[63] Continuation of application No. 08/685,282, Jul. 23, 1996, Pat. No. 5,798,179.

[51] Int. Cl.[7] .............................. B32B 31/00; B44C 1/16; B05D 5/04

[52] U.S. Cl. .................... 156/230; 156/240; 156/244.11; 156/244.16; 156/277; 427/261; 427/288; 427/407.1; 427/411; 427/412.1; 428/913; 428/914

[58] Field of Search .................................... 428/195, 200, 428/211, 212, 323, 411.1, 479.3, 481, 485, 507, 515, 522, 537.5, 913, 914, 327, 347, 511; 156/230, 239, 240, 244.11, 244.16, 277; 427/261, 288, 407.1, 411, 412.1

[56] References Cited

U.S. PATENT DOCUMENTS

| | | | |
|---|---|---|---|
| 3,359,127 | 12/1967 | Meyer et al. | 117/3.4 |
| 3,616,176 | 10/1971 | Jachimowicz | 161/165 |
| 3,872,040 | 3/1975 | Mollohan et al. | 260/21 |
| 4,303,717 | 12/1981 | Andrews | 428/200 |
| 4,322,467 | 3/1982 | Heimbach et al. | 428/200 |
| 4,536,434 | 8/1985 | Magnotta | 428/200 |
| 4,863,781 | 9/1989 | Kronzer | 428/200 |
| 4,929,501 | 5/1990 | Okada et al. | 428/337 |
| 5,064,743 | 11/1991 | Koshizuka et al. | 430/253 |
| 5,087,527 | 2/1992 | Shimura et al. | 428/488.4 |
| 5,139,917 | 8/1992 | Hare | 430/138 |
| 5,151,326 | 9/1992 | Matsuda et al. | 128/336 |
| 5,242,739 | 9/1993 | Kronzer et al. | 428/200 |
| 5,248,543 | 9/1993 | Yamaguchi et al. | 428/195 |
| 5,286,521 | 2/1994 | Matsuda et al. | 427/146 |
| 5,362,703 | 11/1994 | Kawasaki et al. | 403/227 |
| 5,372,987 | 12/1994 | Fisch et al. | 503/227 |
| 5,372,988 | 12/1994 | Takeuchi et al. | 503/227 |
| 5,413,841 | 5/1995 | Mahn, Sr., et al. | 428/195 |
| 5,484,644 | 1/1996 | Imamura et al. | 428/195 |
| 5,501,902 | 3/1996 | Kronzer | 428/323 |
| 5,716,477 | 2/1998 | Yamaguchi et al. | 156/230 |
| 5,798,179 | 8/1998 | Kronzer | 428/411.1 |
| 5,846,367 | 12/1998 | Omote et al. | 156/235 |
| 5,879,813 | 3/1999 | Tanaka et al. | 428/483 |

FOREIGN PATENT DOCUMENTS

| | | |
|---|---|---|
| 820874 A1 | 1/1998 | European Pat. Off. . |
| 2243332 | 10/1991 | United Kingdom . |
| 90/00473 | 1/1990 | WIPO . |
| 91/06433 | 5/1991 | WIPO . |
| 95/08419 | 3/1995 | WIPO . |

*Primary Examiner*—Marie Yamnitzky
*Attorney, Agent, or Firm*—Jones & Askew, LLP

[57] ABSTRACT

A printable heat transfer material having cold release properties, which material includes a flexible first layer having first and second surfaces. The first layer typically will be a film or a cellulosic nonwoven web. A second layer overlays the first surface of the first layer and includes a thermoplastic polymer, such as a hard acrylic polymer or a poly(vinyl acetate). A third layer overlays the second layer and includes a thermoplastic polymer which melts in a range of from about 65° C. to about 180° C. The first layer may be a cellulosic nonwoven web, such as a latex-impregnated paper. The thermoplastic polymer of which the second layer is composed may have a glass transition temperature of at least about 25° C. The second layer also may include an effective amount of a release-enhancing additive, such as a divalent metal ion salt of a fatty acid, a polyethylene glycol, or a mixture thereof. The third layer may include a film-forming binder, which binder may include a powdered thermoplastic polymer. For an ink jet printable heat transfer material, a fourth layer may overlay the third layer, which fourth layer includes a film-forming binder and a powdered thermoplastic polymer. If desired, a fifth layer may overlay the second layer, thereby being located between the second layer and the third layer. The fifth layer may include a film-forming binder which melts in a range of from about 65° C. to about 180° C.

35 Claims, No Drawings

PRINTABLE HEAT TRANSFER MATERIAL HAVING COLD RELEASE PROPERTIES

This application is a continuation of application Ser. No. 08/685,282, now U.S. Pat. No. 5,798,179, entitled "PRINTABLE HEAT TRANSFER MATERIAL HAVING COLD RELEASE PROPERTIES" and filed in the U.S. Patent and Trademark Office on Jul. 23, 1996. The entirety of application Ser. No. 08/685,282 is hereby incorporated by reference.

BACKGROUND OF THE INVENTION

The present invention relates to a heat transfer material, such as a heat transfer paper.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use and are printed on a release or transfer paper. They are applied to the article of clothing by means of heat and pressure, after which the release or transfer paper is removed.

Some effort has been directed to allowing customers the opportunity to prepare their own graphics for application to an article of clothing. The preparation of such graphics may involve the use of colored crayons made from a heat-transferable material. Such crayons have been made available in kit form, which also includes an unspecified heat transfer sheet having an outlined pattern thereon. In a variation of the kit, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer.

The creation of personalized, creative designs or images on a fabric such as a T-shirt or the like through the use of a personal computer system has been described. The method involves electronically generating an image, electronically transferring the image to a printer, printing the image with the aid of the printer on an obverse surface of a transfer sheet which has a final or top coating consisting essentially of Singapore Dammar Resin, positioning the obverse face of the transfer sheet against the fabric, and applying energy to the rear of the transfer sheet to transfer the image to the fabric. The transfer sheet can be any commercially available transfer sheet, the heat-transferable coating of which has been coated with an overcoating of Singapore Dammar Resin. The use of abrasive particles in the Singapore Dammar Resin coating also has been described. The abrasive particles serve to enhance the receptivity of the transfer sheet to various inks and wax-based crayons.

Improved heat transfer papers having an enhanced receptivity for images made by wax-based crayons, thermal printer ribbons, and impact ribbon or dot-matrix printers have been disclosed. For example, a cellulosic base sheet has an image-receptive coating containing from about 15 to about 80 percent of a film-forming binder and from about 85 to about 20 percent by weight of a powdered polymer consisting of particles having diameters from about 2 to about 50 micrometers. The binder typically is a latex. Alternatively, a cellulosic base sheet has an image-receptive coating which typically is formed by melt extrusion or by laminating a film to the base sheet. The surface of the coating or film then is roughened by, for example, passing the coated base sheet through an embossing roll.

Some effort also has been directed at generally improving the transfer of an image-bearing laminate to a substrate. For example, an improved release has been described, in which upon transfer the release splits from a carrier and forms a protective coating over the transferred image. The release is applied as a solution and contains a montan wax, a rosin ester or hydrocarbon resin, a solvent, and an ethylene-vinyl acetate copolymer having a low vinyl acetate content.

Additional effort has been directed to improving the adhesion of the transferred laminate to porous, semi-porous, or non-porous materials, and the development of a conformable transfer layer which enables the melt transfer web to be used to transfer images to uneven surfaces.

Finally, it may be noted that there are a large number of references which relate to thermal transfer papers. Most of them relate to materials containing or otherwise involving a dye and/or a dye transfer layer, a technology which is quite different from that of the present invention.

In spite of the improvements in heat transfer papers, they all require removal of the carrier or base sheet from the material to which an image has been transferred while the carrier or base sheet still is warm. This requirement causes unique problems when transfer is attempted with a hand-held iron because of both uneven heating which is characteristic of hand ironing and cooling of previously ironed portions of the transfer material. Consequently, there is an opportunity for an improved heat transfer paper which will permit removal of the carrier or base sheet after it has cooled, i.e., a printable heat transfer paper having cold release properties. There also is a need for such a paper which is ink jet printable.

SUMMARY OF THE INVENTION

The present invention addresses some of the difficulties and problems discussed above by providing a printable heat transfer material having cold release properties, which material includes a flexible first layer having first and second surfaces. The first layer typically will be a film or a cellulosic nonwoven web. A second layer overlays the first surface of the first layer and is composed of a thermoplastic polymer having essentially no tack at transfer temperatures (e.g., 177 degrees Celsius or ° C.), a solubility parameter of at least about 19 $(Mpa)^{1/2}$, and a glass transition temperature or $T_g$ of at least about 0° C. The thermoplastic polymer of which the second layer is composed may be, by way of example, a hard acrylic polymer or poly(vinyl acetate). A third layer overlays the second layer and includes a thermoplastic polymer which melts in a range of from about 65° C. to about 180° C.

By way of example, the first layer may be a cellulosic nonwoven web. For example, the cellulosic nonwoven web may be a latex-impregnated paper. As another example, the thermoplastic polymer included in the second layer may have a glass transition temperature of at least about 25° C. As a further example, the third layer may include a film-forming binder, which binder may include a powdered thermoplastic polymer. Additionally, the second layer also may include an effective amount of a release-enhancing additive, such as a divalent metal ion salt of a fatty acid, a polyethylene glycol, or a mixture thereof. For example, the release-enhancing additive may be calcium stearate, a polyethylene glycol having a molecular weight of from about 2,000 to about 100,000, or a mixture thereof.

If desired, a fourth layer may overlay the third layer in order to provide an ink jet printable heat transfer material. The fourth layer typically includes a film-forming binder and a powdered thermoplastic polymer, each of which melts in a range of from about 65° C. to about 180° C. Optionally, a fifth layer may overlay the second layer, in which case the third layer will overlay the fifth layer, rather than the second layer. The fifth layer includes a film-forming binder which melts in a range of from about 65° C. to about 180° C. as described above. The resulting ink jet printable heat transfer material possess cold release properties.

DETAILED DESCRIPTION OF THE INVENTION

As used herein, the term "printable" is meant to include the placement of an image on a material by any means, such as by direct and offset gravure printers, silk-screening, typewriters, laser printers, dot-matrix printers, and ink jet printers, by way of illustration. Moreover, the image composition may be any of the inks or other compositions typically used in printing processes.

The term "ink jet printable" refers to the formation of an image on a material, e.g., paper, by means of an ink jet printer. In an ink jet printer, ink is forced through a tiny nozzle (or a series of nozzles) to form droplets. The droplets may be electrostatically charged and attracted to an oppositely charged platen behind the paper. By means of electrically controlled deflection plates, the trajectories of the droplets can be controlled to hit the desired spot on the paper. Unused droplets are deflected away from the paper into a reservoir for recycling. In another method, the droplets are ejected on demand from tiny ink reservoirs by heating to form bubbles as the print head scans the paper.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

The term "hard acrylic polymer" as used herein is intended to mean any acrylic polymer which typically has a $T_g$ of at least about 0° C. For example, the $T_g$ may be at least about 25° C. As another example, the $T_g$ may be in a range of from about 25° C. to about 100° C. A hard acrylic polymer typically will be a polymer formed by the addition polymerization of a mixture of acrylate or methacrylate esters, or both. The ester portion of these monomers may be $C_1$–$C_6$ alkyl groups, such as, for example, methyl, ethyl, and butyl groups. Methyl esters typically impart "hard" properties, while other esters typically impart "soft" properties. The terms "hard" and "soft" are used qualitatively to refer to room-temperature hardness and low-temperature flexibility, respectively. Soft latex polymers generally have glass transition temperatures below about 0° C. These polymers flow too readily and tend to bond to the fabric when heat and pressure are used to effect transfer. The less hard, more easily deformed hard polymers generally require fillers to sufficiently harden the coating. Thus, the glass transition temperature correlates fairly well with polymer hardness.

As used herein, the term "cold release properties" means that once an image has been transferred to a substrate, such as cloth, the backing or carrier sheet (the first layer in the present invention) may be easily and cleanly removed from the substrate after the heat transfer material has cooled to ambient temperature. That is, after cooling, the backing or carrier sheet may be peeled away from the substrate to which an image has been transferred without resisting removal, leaving portions of the image on the carrier sheet, or causing imperfections in the transferred image coating.

As stated earlier, the present invention provides a printable heat transfer material having cold release properties. The printable heat transfer material includes a flexible first layer having first and second surfaces. The flexible first layer serves as a base sheet or backing. The flexible first layer typically will be a film or a cellulosic nonwoven web. In addition to flexibility, the first layer also should have sufficient strength for handling, coating, sheeting, and other operations associated with its manufacture, and for removal after transferring an image. By way of example, the first layer may be a paper such as is commonly used in the manufacture of heat transfer papers.

In some embodiments, the first layer will be a latex-impregnated paper. By way of illustration only, the latex-impregnated paper may be a water leaf sheet of wood pulp fibers or alpha pulp fibers impregnated with a reactive acrylic polymer latex such as Rhoplex® B-15 (Rohm and Haas Company, Philadelphia, Pa.). However, any of a number of other latices can be used, if desired, some examples of which are summarized in Table A, below.

TABLE A

Suitable Latices for Impregnation of First Layer

| Polymer Type | Product Identification |
|---|---|
| Polyacrylates | Hycar ® 26083, 26084, 26120, 26104, 26106, 26322, B. F. Goodrich Company, Cleveland, Ohio |
| | Rhoplex ® HA-8, HA-12, NW-1715, Rohm and Haas Company, Philadelphia, Pennsylvania |
| | Carboset ® XL-52, B. F. Goodrich Company, Cleveland, Ohio |
| Styrene-butadiene copolymers | Butofan ® 4264, BASF Corporation, Sarnia, Ontario, Canada |
| | DL-219, DL-283, Dow Chemical Company, Midland, Michigan |
| Ethylene-vinyl acetate copolymers | Dur-O-Set ® E-666, E-646, E-669, National Starch & Chemical Co., Bridgewater, New Jersey |
| Nitrile rubbers | Hycar ® 1572, 1577, 1570 × 55, B. F. Goodrich Company, Cleveland, Ohio |
| Poly(vinyl chloride) | Vycar ® 352, B. F. Goodrich Company, Cleveland, Ohio |
| Polyvinyl acetate) | Vinac XX-210, Air Products and Chemicals, Inc. Napierville, Illinois |

TABLE A-continued

Suitable Latices for Impregnation of First Layer

| Polymer Type | Product Identification |
|---|---|
| Ethylene-acrylate copolymers | Michem ® Prime 4990, Michelman, Inc., Cincinnati, Ohio<br>Adcote 56220, Morton Thiokol, Inc., Chicago, Illinois |

The impregnating dispersion typically will contain clay and an opacifier such as titanium dioxide. Exemplary amounts of these two materials are 16 parts and 4 parts, respectively, per 100 parts of polymer on a dry weight basis. By way of example only, the first layer may have a basis weight of 13.3 lbs/1300 $ft^2$ (50 $g/m^2$) before impregnation.

The impregnated paper generally may contain impregnant in a range of from about 5 to about 50 percent by weight, on a dry weight basis, although in some cases higher levels of impregnant in the paper may be suitable. As an illustration, the paper may contain 18 parts impregnating solids per 100 parts fiber by weight, and may have a basis weight of 15.6 lbs/1300 $ft^2$ (58 $g/m^2$), both on a dry weight basis. A suitable caliper is 3.8±0.3 mil (97±8 micrometers).

In addition to the paper being impregnated with polymer dispersions as described above, it also may be impregnated with a solution or dispersion of polymers which are wholly or partially soluble in, for example, hot water. For example, the paper may be impregnated with a pigment-containing poly(vinyl alcohol) solution. Other soluble polymers include, by way of illustration only, styrene-maleic anhydride copolymers (base soluble), starch, polyvinylpyrrolidone, and carboxyethyl cellulose.

The first layer is readily prepared by methods which are well known to those having ordinary skill in the art. In addition, paper-impregnating techniques also are well known to those having ordinary skill in the art. Typically, a paper is exposed to an excess of impregnating dispersion, run through a nip, and dried.

A second, or release, layer overlays the first surface of the first layer. The second layer is composed of a thermoplastic polymer having essentially no tack at transfer temperatures (e.g., 177° C.), a solubility parameter of at least about 19 $(Mpa)^{1/2}$, and a glass transition temperature of at least about 0° C. As used herein, the phrase "having essentially no tack at transfer temperatures" means that the second layer does not stick to the third layer (or fifth layer, if present) to an extent sufficient to adversely affect the quality of the transferred image. By way of illustration, the thermoplastic polymer may be a hard acrylic polymer or poly(vinyl acetate). For example, the thermoplastic polymer may have a glass transition temperature ($T_g$) of at least about 25° C. As another example, the $T_g$ may be in a range of from about 25° C. to about 100° C. Examples of suitable polymers include those listed in Table A which have suitable glass transition temperatures. The second layer also may include an effective amount of a release-enhancing additive, such as a divalent metal ion salt of a fatty acid, a polyethylene glycol, or a mixture thereof. For example, the release-enhancing additive may be calcium stearate, a polyethylene glycol having a molecular weight of from about 2,000 to about 100,000, or a mixture thereof.

A third layer overlays the second layer and includes a thermoplastic polymer which melts in a range of from about 65° C. to about 180° C. The third layer functions as a transfer coating to improve the adhesion of subsequent layers in order to prevent premature delamination of the heat transfer material. The layer may be formed by applying a coating of a film-forming binder over the second layer. The binder may include a powdered thermoplastic polymer, in which case the third layer will include from about 15 to about 80 percent by weight of a film-forming binder and from about 85 to about 20 percent by weight of the powdered thermoplastic polymer. In general, each of the film-forming binder and the powdered thermoplastic polymer will melt in a range of from about 65° C. to about 180° C. For example, each of the film-forming binder and powdered thermoplastic polymer may melt in a range of from about 80° C. to about 120° C. In addition, the powdered thermoplastic polymer will consist of particles which are from about 2 to about 50 micrometers in diameter. Desirably, the thickness of the third layer will be from about 12 to about 80 micrometers.

In general, any film-forming binder may be employed which meets the criteria specified herein. As a practical matter, water-dispersible ethylene-acrylic acid copolymers have been found to be especially effective film-forming binders.

Similarly, the powdered thermoplastic polymer may be any thermoplastic polymer which meets the criteria set forth herein. For example, the powdered thermoplastic polymer may be a polyolefin, polyester, ethylene-vinyl acetate copolymer, or polyolefin.

The term "melts" and variations thereof are used herein only in a qualitative sense and are not meant to refer to any particular test procedure. Reference herein to a melting temperature or range is meant only to indicate an approximate temperature or range at which the film-forming binder and/or powdered thermoplastic polymer melt and flow under the conditions of the melt-transfer process to result in a substantially smooth film. In so doing, such materials, and especially the powdered thermoplastic polymer, may flow partially into the fiber matrix of the fabric to which an image is being transferred.

Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point. Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM Test Method E-28, is useful in predicting their behavior in the present invention. Moreover, the melting points or softening points described are better indicators of performance in this invention than the chemical nature of the polymer.

Alternatively, the third layer may be a melt-extruded film. The criteria for a melt-extruded film which forms the third layer are generally the same as those described above for the third layer. The polymer of which a melt-extruded third layer is composed typically will melt in a range of from about 80° C. to about 130° C. The polymer should have a melt index, as determined in accordance with ASTM Test Method D-1238, of at least about 25 g/10 minutes. The chemical nature of the polymer is not known to be climacteric. Polymer types which satisfy these criteria and are commercially available include, by way of illustration only, copolymers of ethylene and acrylic acid, methacrylic acid, vinyl acetate, ethyl acetate, or butyl acrylate. Other polymers which may be employed include polyesters, polyamides, and polyurethanes. Waxes, plasticizers, rheology modifiers, antioxidants, antistats, antiblocking agents, and other additives may be included as either desired or necessary.

The melt-extruded third layer may be applied with an extrusion coater which extrudes the molten polymer through a screw into a slot die. The film exits the slot die and flows by gravity onto the first layer. The resulting coated first layer is passed through a nip to chill the second layer and bond it to the first layer. For less viscous polymers, the molten polymer may not form a self-supporting film. In these cases, the first layer may be coated by directing it into contact with the slot die or by using rolls to transfer the molten polymer from a bath to the first layer.

Because the inks employed in ink jet printers are aqueous based, a fourth layer is useful for a printable heat transfer material on which an image is to be placed by an ink jet printer. The fourth layer prevents or minimizes feathering of the printed image and bleeding or loss of the image when the transferred image is exposed to water. Thus, the fourth layer is an ink jet print layer or coating. The fourth layer may be, for example, the second or print layer described in U.S. Pat. No. 5,501,902 to Kronzer, which patent is incorporated herein by reference. Thus, the fourth layer may include particles of a thermoplastic polymer having largest dimensions of less than about 50 micrometers. Desirably, the particles will have largest dimensions of less than about 20 micrometers. In general, the thermoplastic polymer may be any thermoplastic polymer which meets the criteria set forth herein. Desirably, the powdered thermoplastic polymer will be selected from the group consisting of polyolefins, polyesters, polyamides, and ethylene-vinyl acetate copolymers.

The fourth layer also includes from about 10 to about 50 weight percent of a film-forming binder, based on the weight of the thermoplastic polymer. Desirably, the amount of binder will be from about 10 to about 30 weight percent. In general, any film-forming binder may be employed which meets the criteria set forth herein. When the fourth layer includes a cationic polymer as described below, a nonionic or cationic dispersion or solution may be employed as the binder. Suitable binders include polyacrylates, polyethylenes, and ethylene-vinyl acetate copolymers. The latter are particularly desired because of their stability in the presence of cationic polymers. The binder desirably will be heat softenable at temperatures of about 1 20° C. or lower.

The basis weight of the fourth layer may vary from about 5 to about 30 $g/m^2$. Desirably, the basis weight will be from about 10 to about 20 $g/m^2$. The fourth layer may be applied to the third layer by means well known to those having ordinary skill in the art, as already described. The fourth layer typically will have a melting point of from about 65° C. to about 180° C. Moreover, the fourth layer may contain from about 2 to about 20 weight percent of a cationic polymer, based on the weight of the thermoplastic polymer. The cationic polymer may be, for example, an amide-epichlorohydrin polymer, polyacrylamides with cationic functional groups, polyethyleneimines, polydiallylamines, and the like. When a cationic polymer is present, a compatible binder should be selected, such as a nonionic or cationic dispersion or solution. As is well known in the paper coating art, many commercially available binders have anionically charged particles or polymer molecules. These materials are generally not compatible with the cationic polymer which may be used in the fourth layer.

One or more other components may be used in the fourth layer. For example, this layer may contain from about 1 to about 20 weight percent of a humectant, based on the weight of the thermoplastic polymer. Desirably, the humectant will be selected from the group consisting of ethylene glycol and poly(ethylene glycol). The poly(ethylene glycol) typically will have a weight-average molecular weight of from about 100 to about 40,000. A poly(ethylene glycol) having a weight-average molecular weight of from about 200 to about 800 is particularly useful.

The fourth layer also may contain from about 0.2 to about 10 weight percent of an ink viscosity modifier, based on the weight of the thermoplastic polymer. The viscosity modifier desirably will be a poly(ethylene glycol) having a weight-average molecular weight of from about 100,000 to about 2,000,000. The poly(ethylene glycol) desirably will have a weight-average molecular weight of from about 100,000 to about 600,000.

Other components which may be present in the fourth layer include from about 0.1 to about 5 weight percent of a weak acid and from about 0.5 to about 5 weight percent of a surfactant, both based on the weight of the thermoplastic polymer. A particularly useful weak acid is citric acid. The term "weak acid" is used herein to mean an acid having a dissociation constant less than one (or a negative log of the dissociation constant greater than 1).

The surfactant may be an anionic, a nonionic, or a cationic surfactant. When a cationic polymer is present in the fourth layer, the surfactant should not be an anionic surfactant. Desirably, the surfactant will be a nonionic or cationic surfactant. However, in the absence of the cationic polymer, an anionic surfactant may be used, if desired. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

Finally, a fifth or intermediate layer may overlay the second layer and underlay the third layer, thereby being located between the second layer and the third layer. In general, the fifth layer is not helpful when the third layer is formed from a film-forming binder. When the third layer is a melt-extruded film, however, the third layer may have poor adhesion to the second layer. Poor adhesion may result in delamination in a printer, especially in laser printers, of the third layer from the second layer. To prevent delamination in such cases, the fifth layer is necessary. In general, the fifth layer may include a film-forming binder which melts in a range of from about 65° C. to about 180° C. as described for the third layer. Moreover, the fifth layer also may include a powdered thermoplastic polymer as described for the third layer.

If desired, any of the foregoing film layers may contain other materials, such as processing aids, release agents, pigments, deglossing agents, antifoam agents, and the like. The use of these and similar materials is well known to those having ordinary skill in the art.

The layers which are based on a film-forming binder may be formed on a given layer by known coating techniques, such as by roll, blade, and air-knife coating procedures. The resulting heat transfer material then may be dried by means of, for example, steam-heated drums, air impingement, radiant heating, or some combination thereof.

The present invention is further described by the examples which follow. Such examples, however, are not to be construed as limiting in any way either the spirit or the scope of the present invention. Whenever possible, units of measurement also will be expressed as SI units (International System of Units), whether Basic or Derived. Unless indicated otherwise, all parts are parts by weight and all basis weights are on a dry-weight basis. When the drying of a coating is specified in an example, a Model 28 Precision Scientific Electric Drying Oven was used. Images were transferred to Haynes® Brand 100 percent cotton T-shirts or their equivalent. Washing tests were carried out in a standard home washing machine and dried in a standard home drier. Image transfer involved the use of either a Proctor Silex® brand non-steam home hand iron set at about 163°–177° C. and/or a cotton setting or a Model S-600 heat transfer press (Hix Corporation, Pittsburgh, Kans.).

EXAMPLES

Because of the large amount of experimental data and the complexity of the products being tested, a coding system is used to present the data. First layers (or base papers) are identified as IA, IB, etc. The second layers are identified as IIA, IIB, etc.; third layers as IIIA, etc.; fourth layers as IVA, etc.; and fifth layers as VA, VB, etc. Accordingly, Tables I–V are presented below. In these and all subsequent tables, the letter "I" has been skipped to avoid confusing an identifying designation as a Roman numeral from which the letter portion had been omitted.

TABLE 1

First Layers

| ID | Description |
|---|---|
| IA | A paper prepared from a furnish containing 60% northern bleached softwood kraft pulp and 40% northern bleached hardwood kraft. It had a soft acrylic saturant at a 45% add-on level. The total basis weight was 22.5 lb/1300 $ft^2$ (about 84 $g/m^2$). |
| IB | The paper furnish was bleached softwood kraft. It had an 18% add-on of a soft acrylic saturant. The total basis weight was 17.8 lb/1300 $ft^2$ (about 66 $g/m^2$). |
| IC | James River EDP label base - This was a 22.5 lb/1300 $ft^2$ (about 84 $g/m^2$) uncoated base paper for label stock. |
| ID | The paper furnish was composed of 88% eucalyptus pulp and 12% softwood kraft pulp. The paper was saturated with a mixture of Rhoplex HA 16, 20 dry parts Titanium Dioxide and 20 dry parts of PEG 20M; pick-up was 40 parts per 100 parts of fibers. Total basis weight was 19 lb/1300 $ft^2$ (about 71 $g/m^2$). |
| IE | Neenah Papers 24 lb solar white Classic Crest (24 lb/1300 $ft^2$ or about 90 $g/g/m^2$). |
| IF | A saturating paper (16.5 lb/1300 $ft^2$ or about 62 $g/m^2$) of 50% eucalyptus pulp and 50% softwood kraft pulp, with a 30% pick-up of saturant, a formaldehyde free version of Hycar 26672. |

TABLE II

Second Layers

| ID | Description |
|---|---|
| IIA | Reichhold 97-635 release coat, a modified poly(vinyl acetate). |
| IIB | Hycar 26084 (soft acrylic latex) with 35 parts of ultrawhite 90 clay dispersion. |
| IIC | Hycar 26084 with 100 parts of ultrawhite 90. |
| IID | Hycar 26315 (hard acrylic latex). |
| IIE | Rhoplex HA16 - 100 parts with 30 parts ultrawhite 90 clay dispersion. |
| IIF | 100 parts ultrawhite 90 clay dispersion and 35 parts Rhoplex HA16. |
| IIG | Hycar 26172 - A hard acrylic latex having no ethyl acrylate in it (to reduce the latex odor). |
| IIH | Rhoplex HA16 with 47 parts Celite 263 (diatomaceous earth) and 57 parts ultrawhite 90 clay - 3.8 lb/1300 $ft^2$ (about 14 $g/m^2$). |
| IIJ | Same as IIH, above, but with 2.5 lb/1300 $ft^2$ (about 9 $g/m^2$). |
| IIK | Hycar 26084 with 20 parts of Polyethylene glycol 20M (PEG is a solid which was made into a 20% solution.) |
| IIL | Hycar 26084 with 30 parts of PEG 20M and 20 parts Celite 263. |
| IIM | Rhoplex HA16 with 20 parts of PEG 20M and 30 parts of Celite 263 - coating weight was 3.0 lb/1300 $ft^2$ (about 11 $g/m^2$). |
| IIN | Rhoplex HA16 with 10 parts of PEG 20M and 30 parts of celite 263. |
| IIO | Carboset CR760 - 100 parts with 20 parts PEG 20M. |
| IIP | Rhoplex AC 261 with 3 parts Triton X100 and 20 parts of PEG 20M. |
| IIQ | Modified[a] Hycar 26172 with 20 parts PEG 20M and 3 parts Triton X100. |
| IIR | Modified[a] Hycar 26172 (#2) with 20 parts PEG 20M and 3 parts Triton X100. |
| IIS | Modified[a] Hycar 26106 with 20 parts PEG 20M. |
| IIT | Modified[a] Hycar 26084 with 20 parts PEG 20M. |
| IIU | Modified[a] Hycar 26172 with 3 parts Triton X100, 20 parts of PEG 20M and 25 parts of Nopcote C-104 (Nopcote C-104 is a calcium stearate dispersion). |

[a]Modified B. F. Goodrich polymers prepared in the laboratory to be free of formaldehyde.

Unless otherwise stated, the second layers were applied as dispersions in water with a meyer rod and dried in a forced air oven. The dried coating weight was between 2.5 and 4.5 lb/1300 $ft^2$ (between about 9 and 17 $g/m^2$) unless otherwise stated.

TABLE III

Third Layers

| ID | Description |
|---|---|
| IIIA | Nucrel 599, 1.8 mils of extruded film (11 lb/1300 $ft^2$ or about 41 $g/m^2$). This is a 500 melt flow index ethylene-methacrylic acid copolymer from Dupont. |
| IIIB | Microthene FE532 - 100 parts with 5 parts Triton X100 and 50 parts Michleman 58035. Coating weight was 5.5 lb/1300 $ft^2$ (about 21 $g/m^2$). |
| IIIC | Microthene FE532 - 100 parts, with 5 parts Triton X100 and 100 parts Michleman 58035. Coating weight was 5.5 lb/1300 $ft^2$ (about 21 $g/m^2$). Michelman 58035 is a water dispersion of Allied Chemical's 580, an ethylene-acrylic acid copolymer. |
| IIID | Micropowders MPP635 VF - 100 parts, with 50 parts of Michleman 58035. The MPP635 VF is a high density polyethylene wax powder from Micropowders, Inc. |
| IIIE | 100 parts Micropowders MPP635 VF, 3 parts Triton X100 and 50 parts Michem Prime 4983. Coating weight was 5.5 lb/1300 $ft^2$ (about 21 $g/m^2$). |
| IIIF | 100 parts Michrothene FE532, 35 parts Michleman 58035, 3 parts Triton X100. Coating weight was 7.0 lb/1300 $ft^2$ (about 26 $g/m^2$). |
| IIIG | 100% Michem Prime 4983 - 3 lb/1300 $ft^2$ (about 11 $g/m^2$). |
| IIIH | 100 parts Micropowders MPP635 VF and 50 parts Michem Prime 4990 (4990 is like 4983 but lower in molecular wt.); 7 lb (about 3.2 kg) per ream coating weight. |

TABLE III-continued

| Third Layers | |
|---|---|
| ID | Description |
| IIIJ | 100 Micropowders MPP63S VF, 50 parts Michem Prime 4983, and 50 parts Unimoll 66 (Powdered dicyclohexyl phthalate); 6 lb (about 2.7 kg) per ream. |
| IIIK | 100 parts Micropowders MPP63S VF, 50 parts Michem Prime 4983 and 50 parts Tone 0201 (low molecular weight liquid polycaprolactone); 6 lb (about 2.7 kg) per ream. |
| IIIL | 100 parts of Micropowders MPP635 G (this is simply a coarser particle size version of MPP635.) with 100 parts of Michem Prime 4990. |
| IIIM | 100 parts of Micropowders MPP635 with 100 parts of Michleman 58035 (very low molecular weight polyethylene wax). |
| IIIN | Approximately 4.0 lb/1300 $ft^2$ (about 15 $g/m^2$). of IIIL coating. |
| IIIO | 100 parts of Micropowders MPP635 G, 100 parts of Michem Prime 4990 and 50 parts of Orgasol 3501. |
| IIIP | 50 parts Airflex 140 (an ethylene-vinyl acetate copolymer latex), and 100 parts MPP635 G. |
| IIIQ | 100 parts Microthene FE532 and 100 parts Michem Prime 4990. |
| IIIR | 10.5 (lb/1300 $ft^2$ (about 39 $gm/^2$) (double coat) of IIIM, above. |
| IIIS | 10.5 lb/1300 $ft^2$ (about 39 $g/m^2$) (double coat) of 100 parts Micropowders MPP635 G, 100 parts of Michem Prime 4990 and 50 parts of McWhorter 220–4100 (220–4100 is an acid containing, aromatic polyester which is dispersed in water with amines). |
| IIIT | Like R (above), but with only 25 parts of McWhorter 22–4100. |
| IIIU | 10.5 lb/1300 $ft^2$ (about 39 $g/m^2$) coating of 100 parts Michem Prime 4990, 100 parts MPP635 G and 10 parts of Nopcote C-104 (Nopcote C-104 is a calcium stearate dispersion). |
| IIIV | 10.5 lb/1300 $ft^2$ (about 39 $g/m^2$) coating of 100 parts of Michem Prime 4990, 100 parts MPP635 G and 10 parts of Nopcote DC100A (Nopcote DC100A is an ammonium stearate dispersion). |
| IIIW | Like IIIV, above, but with only 5 parts of Nopcote DC100A. |
| IIIX | 10.5 lb/1300 $ft^2$ (about 39 $g/m^2$) of 100 parts Michem Prime 4990, 100 parts MPP635 G and 20 parts Hycar 26322 (Hycar 26322 is a very soft acrylic latex). |
| IIIY | 10.5 lb/1300 $ft^2$ (about 39 $g/m^2$) of 100 parts Michem Prime 4990 and 50 parts of MPP635 G. |

TABLE IV

| Fourth Layers | |
|---|---|
| ID | Description |
| IVA | The coating consisted of 100 parts Orgasol 3501 EXDNAT 1 (a 10-micrometer average particle size, porous, copolymer of nylon 6 and nylon 12 precursors), 25 parts Michem Prime 4983, 5 parts Triton X100 and 1 part Methocel A-15 (methyl cellulose). The coating weight is 3.5 lb. per 1300 sq. ft. |
| IVB | Like IVA, but with 5 parts of Tamol 731 per 100 parts Orgasol 3501, and the Methocel A-15 was omitted. |
| IVC | Like IIA, but containing 50 parts of Tone 0201 (a low molecular weight. polycaprolactone) per 100 parts Orgasol 3501. |
| IVD | 100 parts Orgasol 3501, 5 parts Tamol 731, 25 parts Michem Prime 4983 and 20 parts PEG 20M. |
| IVE | 100 parts Orgasol 3501, 5 parts Tamol 731, 25 parts Michem Prime 4983 and 5 parts PEG 20M (a polyethylene glycol having a molecular weight of 20,000). |
| IVF | 100 parts Orgasol 3501, 5 parts Tamol 731, 25 parts Michem Prime 4983 and 20 parts PEG 200 (an ethylene glycol oligomer having a molecular weight of 200). |
| IVG | 100 parts Orgasol 3501, 5 parts Tamol 731 and 25 parts Sancor 12676 (Sancor 12676 is a heat sealable polyurethane). |

TABLE V

| Fifth Layers | |
|---|---|
| ID | Description |
| VA | 100 parts Micropowders MPP635 VF (a high density polyethylene wax), 3 parts Triton X100 (ethoxylated octylphenol nonionic surfactant) and 50 parts Michem Prime 4983 (ammonia dispersion of an ethylene-acrylic acid copolymer). |
| VB | 100 parts Micropowders MPP635 VF, 3 parts Triton X100 and 20 parts Michem Prime 4983. |
| VC | 100 parts Micropowders MPP635 VF, 3 parts Triton X100 and 10 parts Michem Prime 4983. |
| VD | 100 parts Microthene FE532 (a powdered ethylene-vinyl acetate copolymer), 3 parts Triton X100 and 10 parts Michem Prime 4983. |
| VE | 100 parts Microthene FE532, 3 parts Triton X100, and 20 parts Michem Prime 4983. |
| VF | Michleman 58035 - an emulsion of a low molecular weight, waxy, ethylene-acrylic acid copolymer. |
| VG | 100 parts Microthene FE532, 3 parts Triton X100, and 10 parts Michleman 58035. |
| VH | 100 parts Microthene FE532, 3 parts Triton X100, and 20 parts Michleman 58035. |
| VJ | 100 parts Microthene FE532, 3 parts Triton X100 and 35 parts Michleman 58035 - coating weight is 2.0 lb. per 1300 sq. ft. |
| VK | Same as VJ, but 3.5 lb. per 1300 sq. ft. |

Initial screening experiments were designed to determine if the concept of a "cold peelable" ink jet heat transfer material was feasible. These experiments are summarized in Table VI, below. Samples (identified in the "ID" column) in Table VI (and subsequent tables) are numbered with the table number and a letter (A to Z); for example, "VIA" would be the first sample in Table VI. The screening technique employed involved placing a paper towel on a T-shirt press (Hix Model S-600, Hix Corp., Pittsburgh, Pa.). A film of the third layer was placed on the paper towel, and the coated experimental sample was placed on the film. The resulting "sandwich" then was heat pressed for 30 seconds at 365° F. (about 185° C. After pressing, about one third of the paper was removed immediately while the sandwich was still hot, about one third after about 30 seconds, and the remaining one third after cooling to ambient temperature. The ease of peeling then was rated subjectively as excellent, good, fair or poor (the poor samples usually could not be removed at all). The design parameters of one of the most interesting samples, VIP, were then incorporated into an ink jet printable, cold peelable heat transfer paper, VIQ, by laminating a film of Nucrel 599 (layer IVA) to the second layer-coated paper in a heat press at 100° C. for about 30 seconds, then coating this sample with the type IVA coating. The sample was then printed with a test pattern and transferred to T-shirt material (100% cotton). The image transferred well after pressing for 30 seconds at 375° F. (about 191° C.) and cooling. The image transferred completely and was smoother and more glossy than "hot peeled" transfers using type C-90642 paper (a hot peel heat transfer paper commercially available from Kimberly-Clark Corporation).

TABLE VI

Initial Designs and Peel Test Results

| | Layer | | | | | Peel Test Results | | |
|---|---|---|---|---|---|---|---|---|
| ID | 1st | 2nd | 5th | 3rd | 4th | Hot | Warm | Cold |
| VIA | IA | IIA | VA | IIIA | None | Excellent | Poor | Fair |
| VIB | IA | IIB | VA | IIIA | None | Excellent | Fair | Poor |

TABLE VI-continued

Initial Designs and Peel Test Results

| | Layer | | | | | Peel Test Results | | |
|---|---|---|---|---|---|---|---|---|
| ID | 1st | 2nd | 5th | 3rd | 4th | Hot | Warm | Cold |
| VIC | IA | IIC | VA | IIIA | None | Excellent | Fair | Poor |
| VID | IA | IID | VA | IIIA | None | Excellent | Fair | Poor |
| VIE | IA | IIA | VB | IIIA | None | Excellent | Fair | Good |
| VIF | IA | IIA | VC | IIIA | None | Excellent | Fair | Good |
| VIG | IA | IIB | VC | IIIA | None | Excellent | Fair | Poor |
| VIH | IA | IIC | VC | IIIA | None | Excellent | Fair | Poor |
| VIJ | IA | IIB | VD | IIIA | None | Excellent | Fair | Poor |
| VIK | IA | IIB | VE | IIIA | None | Excellent | Fair | Poor |
| VIL | IA | IIB | VF | IIIA | None | Excellent | Fair | Good |
| VIM | IA | IIC | VF | IIIA | None | Excellent | Fair | Good |
| VIN | IA | IIB | VG | IIIA | None | Excellent | Fair | Good |
| VIO | IA | IIB | VH | IIIA | None | Excellent | Fair | Good |
| VIP | IA | IIB | None | IIIA | None | Excellent | Fair | Fair |
| VIQ | IA | IIB | None | IIIA | IVA | Excellent | Poor | Good |

In the first set of experiments, the third layer was always an extruded film. The next set of experiments, summarized in Table VII, below, were done to try all water-based coatings. Combinations of Microthene FE532 and Michem 58035 proved to work fairly well with several second layers—especially Rhoplex HA16 and clay. The transferred polymer still had a glossy surface. Also, wash tests of T-shirt materials with transfers from these samples didn't retain color as well as controls made with the C-90642 hot peel paper (images were transferred after heat pressing 30 seconds at 360° F. or about 182° C).

TABLE VII

Evaluation of Water-Based Cold Peel Ink Jet Printable Candidates

| | Layer | | | | Cold | Image |
|---|---|---|---|---|---|---|
| ID | 1st | 2nd | 3rd | 4th | Peelability | Transfer |
| VIIA | IB | IIG | IIIB | IVA | Poor | Good |
| VIIB | IB | IIB | IIIB | IVA | Good | Good |
| VIIC | IB | IIE | IIIB | IVA | Excellent | Good |
| VIID | IC | IIF | IIIB | IVA | Excellent | Good |
| VIIE | IC | IIB | IIIC | IVA | Good | Good[a] |

[a]Image was less glossy than samples with IIIB 3rd layer.

Using the third layers IIIB or IIIC, and BP101 (first layer IB), and a new second layer, IIH, seemed to solve the gloss problem. Second layer IIH had a matte, "micro-rough" surface from the Celite 263 filler which is a diatomaceous earth. These results are summarized in Table VIII, below. Heat pressing conditions were the same as in Table VII. The IIID base coat—using Micropowders MPP635VF in place of the ethylene-vinyl acetate copolymer Microthene FE532 was tried to see if the washability could be improved. It didn't release from the IIH second layer, however.

TABLE VIII

Evaluation of Matte Finish Second Layers With Water-Based Ink Jet Inks

| | Layer | | | | Peel | Image | Image |
|---|---|---|---|---|---|---|---|
| ID | 1st | 2nd | 3rd | 4th | Test | Transfer | Appearance |
| VIIIA | IB | IIH | IIIB | IVA | Good | Good | Good (matte) |
| VIIIB | IB | IIJ | IIIB | IVA | Good | Fair | Good (matte) |
| VIIIC | IB | IIH | IIIC | IVA | Good | Good | Good (matte) |
| VIIID | IB | IIH | IIID | IVA | Good | — | — |

The next set of experimental samples involved the preparation of a series of second layer-coated samples, followed by coating them with the Nucrel 599 film (IIIA third layer) by taping the samples to a paper web being coated. The coated samples which showed sufficient adhesion of the base coat were coated with a fourth layer, IVA, printed with a test pattern and transferred to 100% cotton T-shirt material using a hand iron. The iron was set at the #6 setting (cottons) and pre-heated. The paper was ironed with two passes using quite a bit of pressure; i.e., one pass down the length of each side of an 8½"×11" sheet, overlapping in the middle. Then, 10 rapid trips over the paper, each covering the entire surface, were made using moderate pressure. The paper was removed after cooling for one minute. The results are summarized in Table IX.

TABLE IX

Results with Samples Coated With Nucrel 599 Third Layer

| Layer | | | | 3rd | | Peel | Image | |
|---|---|---|---|---|---|---|---|---|
| 1st | 2nd | 5th | 3rd | Adh. | 4th | Test | Transfer | ID |
| IA | IIL | — | IIIA | Poor | IVA | — | | IXA |
| ID | IIM | — | IIIA | Fair | IVA | Excellent | Excellent | IXB |
| ID | IIM | VJ | IIIA | Good | IVA | Excellent | Excellent | IXC |
| ID | IIM | VJ | IIIA | Poor | | Trial Failed | | TR-A |
| ID | IIM | None | IIIA | Poor | | Trial Failed | | TR-B |
| ID | IIN | None | IIIA | Fair | IVA | Excellent | Excellent | TR-C |
| ID | IIN | VJ | IIIA | Fair | IVA | Excellent | Excellent | TR-D |

Samples IXB and IXC were duplicated in trial runs TR-A and TR-B, respectively. However, when the precursor rolls were coated with the IIIA third layer, adhesion was poor and no usable material was obtained. This led to the modification of the second layer again, i.e., reducing the amount of PEG 20M to 10 parts (IIN second layer). Trials TR-C and TR-D made with this release coat were more successful, but the extrusion coating step (application of the IIIA third layer) had to be run very slowly (60 fpm) in order to prevent film delamination from occurring in processing.

It was observed that there were several disadvantages with samples from TR-C and TR-D. Transfers made with TR-D, which had an additional polymer layer transferred to the fabric (fifth layer), tended to develop cracks in the polymer layer after several washings. A similar but less severe problem was seen with sample TR-C. This was probably partly because, in hot peeling the paper, some polymer is left on the paper while in the cold peel designs it is all transferred. Another factor is that people probably will tend to use less heat and pressure when ironing the cold peel design, since it always will transfer the entire polymer layer even though the penetration into the fabric isn't as complete as it could be. Still another problem was the expected high cost of the multiple coatings for this design, especially since one of the coatings was done on an extruder at a very slow speed. It seemed possible that all these problems could be solved if all the coating could be done with water-based polymers, so new water-based alternatives were sought.

Results of the next set of experiments with all water-based coatings are summarized in Table X. These were evaluated using the hand ironing technique already described.

TABLE X

Evaluation of Water-Based Designs

| Layer | | | | | Peel | Image | Wash | |
|---|---|---|---|---|---|---|---|---|
| 1st | 2nd | 5th | 3rd | 4th | Test | Transfer | Test | ID |
| ID | IIN | None | None | IVB | Poor | Good | Fair[a] | XA |
| ID | IIN | VJ | None | IVB | Fair | Good | Fair[a] | XB |
| ID | IIN | VK | IIIF | IVB | Fair | Good | Fair[b] | XC |
| ID | IIN | VK | IIIG | IVB | Fair | Good | Good[c] | XD |
| ID | IIN | None | IIIE | IVB | Poor | Good | Good | XE |

[a]More color lost on washing than the C-90642 control.
[b]More image cracking than with the C-90642 control.
[c]Glossy image with a little cracking and color loss.

Some of the samples, especially XE which has no fifth layer, looked very promising. The elimination of the fifth layer seemed to give less image cracking. This was thought to be due to using lower molecular weight polymers (IIIE), which should flow more into the fabric when the image was transferred. However, since neither of these components would release from the IIN second layer, alternative second layers were sought. The results are summarized in Table XI.

TABLE XI

Evaluation of All Water Based, Ink Jet Printable Samples Having Improved Release Coatings, Easier Release and Low Odor.

| Layer | | | | | Peel | Image | | |
|---|---|---|---|---|---|---|---|---|
| 1st | 2nd | 4th | 3rd | 4th | Test | Transfer | Washability | ID |
| IB | IIO | IVB | IIIF | None | Good | Good | Good | XIA[a] |
| IB | IIP | IVB | IIIF | None | Good | Good | Good | XIB[a] |
| IB | IIO | IVB | IIIH | None | Good | Good | Good | XIC[b] |
| IB | IIO | IVB | IIIJ | None | Good | Good | Good | XID[c] |
| IB | IIO | IVB | IIIK | None | Good | Good | Good | XIE[c] |
| IB | IIO | IVC | IIIF | None | Good | Good | Poor | XIF[d] |
| IE | IIO | IVB | IIIF | None | Good[e] | Good | — | XIG |

[a]Good sample.
[b]The Michem 4990 gave a little softer image than Michem 4983.
[c]No softer than XIA.
[d]More print bleed than control or XIA.
[e]The bond paper was formaldehyde free but tended to delaminate in peel tests.

Several conclusions were drawn from the data in Table XI. Again, the ironing technique described earlier was used. The second layers were the first to give good release of the micropowders-Michem Prime coatings, giving a product which seemed nearly acceptable. One attempt to soften the polymer mass being transferred (sample XIC) was in the right direction. This sample employed a lower molecular weight ethylene-acrylic acid binder than Michem Prime 4983. The Unimoll 66 and Tone 0201 were added to see if the Orgasol, which is a polyamide, could be softened. The Tone 0201 did soften it considerably, but gave more ink bleeding on printing and poor washability. Following these promising results, it was discovered that the Carboset 760 tends to yellow when heated.

Sample XIG was made to see if an unsaturated bond paper could be used for the first layer (or base paper) of this design, e.g., to eliminate odors from the saturant as well as formaldehyde. Unfortunately, it tended to delaminate too easily, leaving a possibility of ironing failures. Therefore, in the next set of experiments, some formaldehyde free, low odor latices from B. F. Goodrich were evaluated as both the saturants and second layers.

B. F. Goodrich provided two formaldehyde-free versions of Hycar 26172, namely, a formaldehyde-free Hycar 26106 and a formaldehyde-free Hycar 26084. The 26172 and 26106 are hard acrylics, while 26084 is softer and has a slight acrylate odor.

First layer or base paper IF, an eucalyptus-hardwood blend base paper at a basis weight of 16.5 lb per 1300 sq. ft., was saturated with formulations containing each latex combined with 25 dry parts of Titanium Dioxide dispersion (PD 14). The saturant pickup was 40±4%. After drying, each sample was heated for 30 seconds at 375° F. in a heat press and also ironed on the hottest hand iron setting over a piece of T-shirt material. Neither of the samples having the Hycar 26172 variants yellowed on heat pressing. They yellowed slightly when ironed. The samples having Hycar 26084 and 26106 variants yellowed more.

The four latices were also evaluated as second layers, each having 20 dry parts PEG 20M. The third layer used for these tests was IIIF, and the fourth layer was IVB. After these coatings were applied to the second layers, the samples were ironed onto T-shirt material, cooled, and peeled off. The data are summarized in Table XII. Unfortunately, the "least yellowing" latex samples did not provide release like the modified 26106 or 26172. This was thought to be due to differences in surfactants, since some surfactants can provide release by concentrating at the coating surface. Indeed, when calcium stearate as added, release became excellent.

TABLE XII

Evaluation of Low Odor, Formaldehyde-Free Second Layers With IIIF Third Layer and IVB Fourth Layer

| Layer | | | Cold | |
|---|---|---|---|---|
| 1st | 2nd | 5th | Peel Test | ID |
| IB | IIQ | None | Poor | XIIA |
| IB | IIR | None | Poor | XIIB |
| IB | IIS | None | Good | XIIC |
| IB | IIT | None | Good | XIID |
| IB | IIU | None | Excellent | XIIE |

Several additional attempts to soften the transferred image (polymer) on the T-shirt material are summarized in Table XIII. Again, the ironing technique described earlier was employed. From this work it was learned that lower third layer basis weights (sample XIIIC) made the cracking worse. Lower molecular weight waxes or polymers (sample XIIIB) eliminated the cracking but washability was worse, namely, more loss of color on washing. Higher molecular weight polymers, such as Microthene FE 532 and Orgasol 3501, added to the third layer gave more cracking.

TABLE XIII

Trial Samples With Pilot Second Layer-Coated Paper - Attempts To Soften Transferred Image

| ID | Layer 1st | 2nd | 3rd | 4th | Image Transfer | Peel Test | Washability | Softness |
|---|---|---|---|---|---|---|---|---|
| XIIIA | IF | IIS | IIIL | IVB | Excellent | Excellent | Good | Slight Cracking |
| XIIIB | IF | IIS | IIIM | IVB | Excellent | Excellent | Poor[a] | Excellent |
| XIIIC | IF | IIS | IIIN | IVB | Excellent | Excellent | Good | Cracking |
| XIIID | IF | IIS | IIIO | IVB | Excellent | Excellent | Good | Cracking |
| XIIIE | IF | IIS | IIIP | IVB | Not cold peelable | | — | — |
| XIIIF | IF | IIS | IIIQ | IVB | Excellent | Excellent | Good | Cracking |

[a]Color faded with repeated washings.

The data summarized in Table XIII confirmed the difficulty in making the transferred polymer image softer while eliminating the cracking and retaining good washability. The only clue to solving this problem was that the cracking became worse when the coating weight was reduced (sample XIIIC). This is opposite to what one might expect, since the cracking always appeared to come from excess polymer on the fabric surface. Accordingly, higher third layer basis weights were investigated. The results of these investigations are summarized in Table XIV; again, ironing was carried out as described earlier. The data in Table XIV confirmed the need for a heavy third layer to eliminate the cracking problem. It now is known that the cracks in the polymer on the fabric develop when the entire polymer mass being transferred is too hard or if the molecular weights of the materials are too high. The fourth layer polymer mass in itself has a high molecular weight and this cannot be modified without creating printability or washability problems. The third layer can be much lower in molecular weight or much softer, but it becomes effective only if its mass is much greater than the fourth layer mass. However, too low a molecular weight gives poor washability. All the third layer modifications done thus far have been ineffective in providing the needed effect at the 6 lb per ream coating weight.

Samples in Table XIV which gave the softest touch after transferring to the T-shirt material showed no cracking, but generally lost more color on washing. In these samples, many of the materials which gave the softening effect were more effective in the fourth layer than in the third layer. It is thought that the calcium stearate in the third layer had a hardening effect, while the ammonium stearate gives a soft tactile impression since it loses ammonia on drying to become stearic acid. The PEG 20M is a very soft, waxy material which gave the desired softening affect but seemed to make the image more water sensitive. (Of course, PEG is water soluble.) Surprisingly, the PEG 200 seemed to have a softening affect without negatively affecting washability. One theory for this is that it may soften the Orgasol polyamide at high temperatures, when the transfer is being carried out, but may become incompatible again after cooling. Then, it simply washes out of the polymer mass when the fabric is washed. More work has to be done before the ideal PEG level and molecular weight are determined. PEG 200 may be too volatile and the vapor could be irritating, while PEG 20M gives poor washability. Some in-between molecular weight may be ideal.

Five separate preparations of Sample XIVJ have given acceptable results. In each attempt, the printed sample was ironed onto a 100% cotton T-shirt material using the previ-

TABLE XIV

Summary of Designs Having 9 to 11 lb. per 1300 sq. ft.[a] Third Layer Weights

| 1st | 2nd | 3rd | 4th | Image Transfer | Peel Test | Washability | Softness | ID |
|---|---|---|---|---|---|---|---|---|
| IF | IIS | IIIR | IVB | Excellent | Excellent | Excellent | U. Sl. Cracking | XIVA |
| IF | IIS | IIIS | IVB | Excellent | Excellent | Poor | Excellent | XIVB |
| IF | IIS | IIIT | IVB | Excellent | Excellent | Fair | Good | XIVC |
| IF | IIS | IIIU | IVB | Excellent | Excellent | Excellent | Cracking | XIVD |
| IF | IIS | IIIV | IVB | Excellent | Excellent | Good | Good[a] | XIVE |
| IF | IIS | IIIW | IVB | Excellent | Excellent | Good | Good[a] | XIVF |
| IF | IIS | IIIX | IVB | Excellent | Excellent | Good | Cracking | XIVG |
| IF | IIS | IIIY | IVB | Excellent | Excellent | Excellent | Good[b] | XIVH |
| IF | IIU | IIIY | IVB | Excellent | Excellent | Excellent | Good[b] | XIVJ |
| IF | IIS | IIIR | IVD | Excellent | Excellent | Poor | Excellent | XIVK |
| IF | IIS | IIIR | IVE | Excellent | Excellent | Good | Good | XIVL |
| IF | IIS | IIIR | IVF | Excellent | Excellent | Excellent | Good[b] | XIVM |
| IF | IIS | IIIR | IVG | Excellent | Good | Fair | Good | XIVN |

[a]About 34 gsm to about 41 gsm.
[b]Softer feeling surface.
[c]No cracking.

ously described procedure. The T-shirt material was washed five times in a home laundry with the machine set on the warm/cold cycle. There was no cracking of the image. Comparing the XIVJ sample and a control, the XIVJ sample gave a more glossy image area if cold peeled, but not if hot peeled, from the fabric. The control was "hot peel" type C-90642.

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of making a printable heat transfer material comprising:

providing a flexible first layer having first and second surfaces and selected from the group consisting of films and cellulosic nonwoven webs;

applying a second layer onto the first surface of the first layer, wherein the second layer has essentially no tack at transfer temperatures of about 177° C. and comprises a thermoplastic polymer having a solubility parameter of at least about 19 $(Mpa)^{1/2}$, and a glass transition temperature of at least about 0° C.; and applying a third layer onto the second layer, wherein the third layer comprises a thermoplastic polymer which melts in a range of from about 65° C. to about 180° C. and has a solubility parameter less than about 19 $(Mpa)^{1/2}$; wherein the second and third layers are adapted to provide the printable heat transfer material with cold release properties.

2. The method of claim 1, wherein the first layer is a cellulosic nonwoven web.

3. The method of claim 2, wherein the cellulosic nonwoven web is a latex-impregnated paper.

4. The method of claim 1, wherein the thermoplastic polymer comprising the second layer has a glass transition temperature of at least about 25° C.

5. The method of claim 1, wherein the thermoplastic polymer comprising the second layer is selected from the group consisting of acrylic polymers and poly(vinyl acetate).

6. The method of claim 1, wherein the third layer comprises a film-forming binder.

7. The method of claim 1 , wherein the third layer comprises a powdered thermoplastic polymer and a film-forming binder.

8. The method of claim 1, wherein the second and third layers are formed by roll coating, blade coating, air-knife coating or melt-extruding.

9. The method of claim 1, wherein the method further comprises:

printing an image onto a surface of the third layer.

10. The method of claim 9, wherein the image is formed by an ink jet printing process.

11. A method of transferring a printed image to a substrate comprising:

positioning the heat transfer material formed by the method of claim 9 adjacent to the substrate;

applying heat and pressure to the heat transfer material; and peeling a removable portion of the heat transfer material from the substrate.

12. The method of claim 11, further comprising:

allowing the heat transfer material to cool to ambient temperature prior to the peeling step.

13. A method of making an ink jet printable heat transfer material comprising:

providing a flexible first layer having first and second surfaces and selected from the group consisting of films and cellulosic nonwoven webs;

applying a second layer onto the first surface of the first layer, wherein the second layer has essentially no tack at transfer temperatures of about 177° C. and comprises a thermoplastic polymer having a solubility parameter of at least about 19 $(Mpa)^{1/2}$, and a glass transition temperature of at least about 0° C.;

applying a third layer onto the second layer, wherein the third layer comprises a thermoplastic polymer which melts in a range of from about 65° C. to about 180° C. and has a solubility parameter less than about 19 $(Mpa)^{1/2}$; and applying a fourth layer onto the third layer, wherein the fourth layer comprises a film-forming binder and a powdered thermoplastic polymer, wherein each of the film-forming binder and the powder thermoplastic polymer melts in a range of from about 65° C. to about 180° C.;

wherein the second and third layers are adapted to provide the printable heat transfer material with cold release properties.

14. The method of claim 13, wherein the first layer is a cellulosic nonwoven web.

15. The method of claim 14, wherein the cellulosic nonwoven web is a latex-impregnated paper.

16. The method of claim 13, wherein the thermoplastic polymer comprising the second layer has a glass transition temperature of at least about 25° C.

17. The method of claim 13, wherein the second layer further comprises an effective amount of a release-enhancing additive.

18. The method of claim 17, wherein the release-enhancing additive comprises a divalent metal ion salt of a fatty acid, a polyethylene glycol, or a mixture thereof.

19. The method of claim 18, wherein the release-enhancing additive is calcium stearate; a polyethylene glycol having a molecular weight of from about 2,000 to about 100,000; or a mixture thereof.

20. The method of claim 13, wherein the second, third and fourth layers are formed by roll coating, blade coating, air-knife coating or melt-extruding.

21. The method of claim 13, wherein the method further comprises:

printing an ink jet ink image onto a surface of the fourth layer.

22. A method of transferring a printed image to a substrate comprising:

positioning the heat transfer material formed by the method of claim 21 adjacent to the substrate;

applying heat and pressure to the heat transfer material; and peeling a removable portion of the heat transfer material from the substrate.

23. The method of claim 22, further comprising:

allowing the heat transfer material to cool to ambient temperature prior to the peeling step.

24. A method of making a printable heat transfer material comprising:

providing a flexible first layer having first and second surfaces and selected from the group consisting of films and cellulosic nonwoven webs;

applying a second layer onto the first surface of the first layer, wherein the second layer has essentially no tack at transfer temperatures of about 177° C. and comprises a thermoplastic polymer having a solubility parameter of at least about 19 $(Mpa)^{1/2}$, and a glass transition temperature of at least about 0° C.;

applying a fifth layer onto the second layer, wherein the fifth layer comprises a film-forming binder which melts in a range of from about 65° C. to about 180° C. and has a solubility parameter less than about 19 $(Mpa)^{1/2}$; and applying a third layer onto the fifth layer, wherein the third layer comprises a thermoplastic polymer film which melts in a range of from about 65° C. to about 180° C. and has a solubility parameter less than about 19 $(Mpa)^{1/2}$; wherein the second and fifth layers are adapted to provide the printable heat transfer material with cold release properties.

25. The method of claim 24, wherein the thermoplastic polymer comprising the second layer has a glass transition temperature of at least about 25° C.

26. The method of claim 24, wherein the second layer further comprises an effective amount of a release-enhancing additive.

27. The method of claim 26, wherein the release-enhancing additive comprises a divalent metal ion salt of a fatty acid, a polyethylene glycol, or a mixture thereof.

28. The method of claim 26, wherein the release-enhancing additive is calcium stearate; a polyethylene glycol having a molecular weight of from about 2,000 to about 100,000; or a mixture thereof.

29. The method of claim 24, wherein the second, fifth and third layers are formed by roll coating, blade coating, air-knife coating or melt-extruding.

30. The method of claim 24, wherein the method further comprises:

applying a fourth layer onto the third layer, wherein the fourth layer comprises a film-forming binder and a powdered thermoplastic polymer, wherein each of the film-forming binder and the powder thermoplastic polymer melts in a range of from about 65° C. to about 180° C.

31. The method of claim 30, wherein the method further comprises:

printing an ink jet ink image onto a surface of the fourth layer.

32. The method of claim 24, wherein the third layer is a melt-extruded film.

33. A method of making a printed substrate comprising:

forming a heat transfer material, wherein the heat transfer material comprises:

a flexible first layer having first and second surfaces and selected from the group consisting of films and cellulosic nonwoven webs;

a second layer on the first surface of the first layer, wherein the second layer has essentially no tack at transfer temperatures of about 177° C. and comprises a thermoplastic polymer having a solubility parameter of at least about 19 $(Mpa)^{1/2}$, and a glass transition temperature of at least about 0° C.; and a third layer on the second layer, wherein the third layer comprises a thermoplastic polymer which melts in a range of from about 65° C. to about 180° C. and has a solubility parameter less than about 19 $(Mpa)^{1/2}$;

printing an image on a printable surface of the heat transfer material, the printable surface being opposite to the second surface;

positioning the printable surface of the heat transfer material adjacent to the substrate;

applying heat and pressure to the heat transfer material; and peeling a removable portion of the heat transfer material from the substrate.

34. The method of claim 33, further comprising:

allowing the heat transfer material to cool to ambient temperature prior to the peeling step.

35. The method of claim 33, wherein the image is formed by an ink jet printing process.

* * * * *